ID

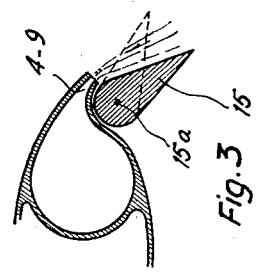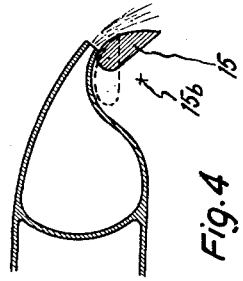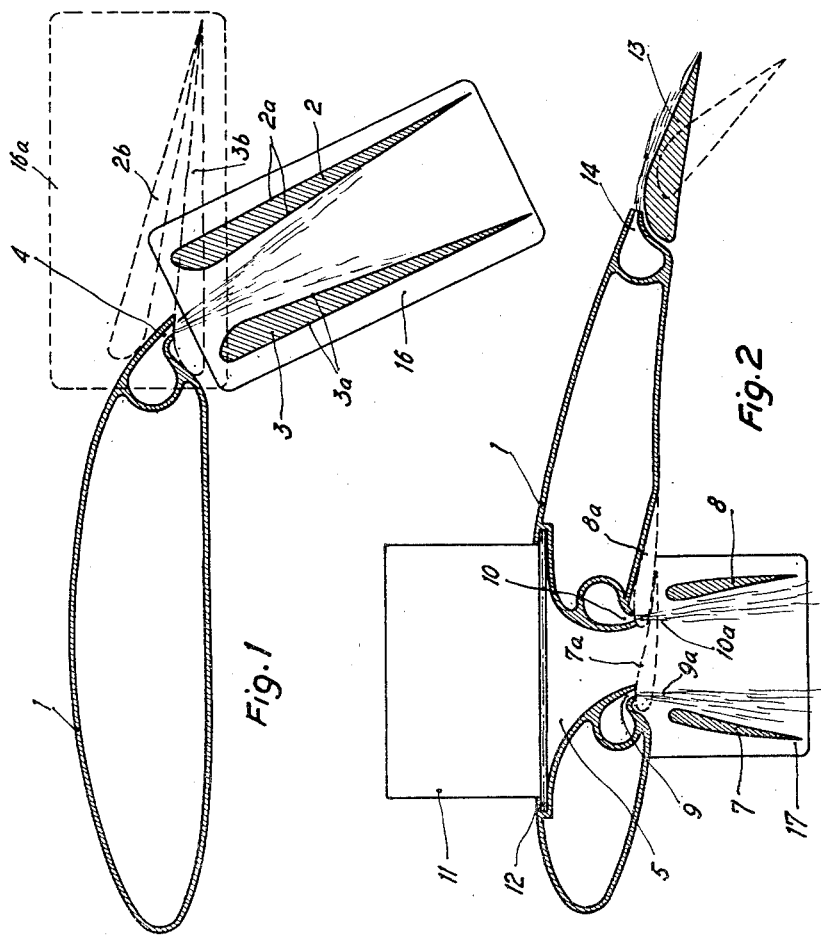

United States Patent Office 3,045,947
Patented July 24, 1962

3,045,947
EJECTORS, PARTICULARLY FOR PRODUCING
LIFT IN AIRCRAFT
Jean Henri Bertin, Paris, and Marcel Pierre le Nabour, Montreuil-sous-Bois, France, assignors to Bertin & Cie, Paris, France, a company of France
Filed Apr. 19, 1960, Ser. No. 23,189
Claims priority, application France Apr. 24, 1959
7 Claims. (Cl. 244—12)

Ejectors generally comprise diffusers formed of divergent material walls situated about the inducing jet or jets. This is also true in the case of fluid-divergent ejectors when the fluid divergent portion is prolonged by a material divergent portion so as to improve efficiency and stability, as described more particularly in the Certificate of Addition No. 69,948 of June 25, 1956, attached to French Patent No. 1,139,801 of November 29, 1955.

When these ejectors are used for providing lift in aircraft these material diffusers are very bulky and become a nuisance when the aircraft is in horizontal flight, which is precisely the time when the lift provided by the nozzles can become slight and may even not be required at all, it being easy to provide sufficient lift with the aerofoils of the aircraft.

The convergent portion of the ejectors is less troublesome since it is less bulky.

The invention makes it possible to overcome these disadvantages of lift-producing ejectors, whether the ejectors are intended to provide the total lift for the aircraft or to be only auxiliary means provided for reducing the length of time during which the landing gear of the aircraft is in contact with the ground when taking-off or landing.

According to the invention, the material diffuser is constituted at least partly by an apparatus of mobile flaps or walls adapted to be retracted into the normal aerodynamic contour of the aircraft, thus, more particularly, reducing the drag on the aircraft.

Preferably, the ejectors according to the invention are formed of conical or cylindrical developable or plane surfaces, extending parallel to the span of the supporting wings with which these ejectors co-operate. This construction is particularly advantageous with the use of inducing jets forming fluid divergent screens.

The description which now follows with reference to the accompanying drawings, given by way of non-limitative example, will make it readily understood how the invention can be carried into effect, the features brought out from the text or from the drawing being understood to form part of the said invention.

FIG. 1 is a cross-sectional view of an aircraft wing provided near its trailing edge with a retractable ejector apparatus according to one form of embodiment of the invention.

FIG. 2 is also a cross-section of a wing, and shows a modified form of embodiment and arrangement of the retractable ejector.

FIGS. 3 and 4 show details of variants.

FIG. 1 shows a form of embodiment comprising an auxiliary ejector for assisting at take-off, which is situated at the rear of an aircraft wing 1. The material convergent-divergent portion of this ejector is constituted by two flaps 2 and 3 each in the form of cylinders whose directrix is the curve 2a, 3a which is contained in the plane of FIG. 1 and which is tapered to have an aerodynamic low-drag shape and whose generatrices extend perpendicularly to the plane of FIG. 1, that is to say parallel to the span of the wing. The inducing jet of the ejector is supplied by a nozzle 4 arranged at the rear of the wing and which can be a slot of the same length as that of the generatrices of the flaps 2 and 3 or preferably is constituted by a succession of holes arranged close together, the orientation of slots or holes being such that the inducing jet issues therefrom along the axial plane of the convergent-divergent duct formed between the flaps when the latter are in their operative position shown in full lines in the figure. This duct is bounded at its two ends by plates such as 16 arranged perpendicularly to the generatrices of the flaps and connected to the latter.

In the retracted position of the ejector, the plates 16 constituting the supports for the flaps are situated at 16a and the flaps 2b, 3b as shown in chain lines. The flaps can be pivotably connected to the plates 16 so that, in this retracted position, the tapered end edges of the flaps come together to form the trailing edges of the wing, whilst the front edges of the said flaps bear against the wing to extend its cross-section. It will be seen, therefore, that an ejector of this kind has no detrimental influence on the drag of the aircraft during horizontal flight, when its supporting action has become unnecessary, whilst when the ejector is operative it adds an additional lifting force owing to the fact that the flaps, situated near the trailing edge and downwardly inclined, act as high-lift flaps.

The form of embodiment shown in FIG. 2 illustrates a lift-producing ejector whose convergent portion 5 is fixed and arranged in a wing 1 in the vicinity of the maximum cross-section thereof. The divergent section of this ejector is composed of two successive portions, namely: on the one hand a fluid portion formed of jets 9a, 10a in the form of thin screens issuing from two slots 9, 10 provided along the edges, perpendicular to the plane of the figure, of the convergent sections 5; on the other hand, a material portion constituted of two flaps 7, 8 of cylindrical shape like the flaps 2 and 3 described previously. As in the case of FIG. 1, these flaps 7, 8 are carried by plates 17 which at the ends of the flaps bound the ducts formed between them. These plates 17, which are directed into the relative wind, can be fixed in position without causing any disadvantages. The flaps 7 and 8 are mobile relatively to the said plates in such manner as to be capable of retracting as shown in chain lines at 7a and 8a, the flap 8 withdrawing into a housing formed on the lower surface of the wing, whilst the flap 7 closes the throat of the convergent section 5 and partly covers the flap 8.

The inlet aperture of the convergent section 5 can be closed by plates 11 pivotally mounted on spindles 12 arranged in the direction of the chord of the wing, so that in their open position shown in FIG. 2 these plates do not hinder the forward movement of the aircraft, and also the forces to be exerted by their control elements are not too great.

In the illustrated embodiment, the wing also comprises on its trailing edge a high-lift flap 13 whose upper surface is subjected to a discharge from a slot 14 in accordance with a well-known principle. The diving torque resulting therefrom makes it possible to compensate for the climbing torque which may be caused by the ejector under certain flying conditions.

It should be noted that in the two forms of embodiment of FIGS. 1 and 2 the inclination of the flaps of the ejector (2, 3 in FIG. 1 and 7, 8 in FIG. 2) can be so regulated as to correspond to the best setting of the ejector for the actual flying speed and direction and the useful lifting force required, the control of the inclination being effected by the pilot or by an automatic device.

For the same purpose, means for regulating the orientation of the inducing jet can be provided.

FIG. 3 shows, by way of example, a form of embodiment wherein the slot-shaped nozzle 4 or 9 producing an inducing jet is associated with a small flap 15 forming a rounded lip tangentially to one of the edges of the said nozzle. The jet issuing from this nozzle adheres to this lip by a natural adhesion effect and, by causing the flap 15 to pivot about a shaft 15a, it is possible in this way to modify the direction of the jet in order to adapt it to the direction of the ejector flaps.

In the variant shown in FIG. 4, the rounded lip 15 can be varied as regards its useful length by pivoting about an eccentric axis 15b.

Naturally, the flaps of the ejectors could also retract into other parts of the aircraft than the wings, for example into the fuselage. They could also constitute part of the supporting surface of the aircraft after they have been retracted.

The ejectors are bounded at their ends by surfaces substantially parallel to the plane of the figures, which surfaces can be fixed to one of the flaps—like 16 in FIG. 1 which is fixed to the flap 3—or can be connected to a fixed part of the aircraft—like 17 in FIG. 2—or can even constitute a wall of the aircraft fuselage.

The object of these surfaces is to prevent the entry of atmospheric air laterally between the flaps, which would disturb the operation of the ejectors.

Naturally, the dimensions of the ejectors can vary according to the cross-sections. More particularly the diffuser can form conical surfaces to adapt itself, for example, to wings of the same shape, such as delta wings. At the narrowest end of the ejector, the end surfaces described hereinbefore can be reduced in size or dispensed with.

What is claimed is:

1. In an aircraft having a wing, a retractible ejector device comprising two cooperating flaps mounted spanwise along the wings and each having a leading edge and a trailing edge and an inside surface and an outside surface, means for supporting said flaps in a retracted position while permitting said flaps to be moved into an active position, said flaps in said retracted position having at least part of their inside surfaces substantially applied against each other and having at least their outside surfaces extending the surfaces of a fixed part of said wing to form part of the streamlined aerodynamic profile of said wing, and means for moving said flaps into said active position in which the inside surfaces of said flaps define a divergent downwardly-directed diffuser and their leading edges are spaced from said fixed part of said wing to provide a passage for the induction of ambient air, and spanwise nozzle means for injecting jets of fluid under pressure to induce said ambient air downward.

2. In an aircraft having a wing, a retractible ejector device comprising two cooperating flaps mounted spanwise along the wing and each having a leading edge and a trailing edge, an inside surface and an otuside surface, means for supporting said flaps in a retracted position while permitting said flaps to be moved into an active position, said flaps in said retracted position having their inside surfaces substantially applied against each other at least in the vicinity of their trailing edges and having their outside surfaces providing an extension of the upper and lower surfaces of a fixed part of said wing to form part of the streamlined aerodynamic profile of said wing, and means for moving said flaps into said active position in which the inside surfaces of said flaps define a divergent downwardly-directed diffuser and their leading edges are spaced from said fixed part of said wing to provide a passage for the induction of ambient air, and spanwise nozzle means for injecting jets of fluid under pressure to induce said ambient air downward.

3. An ejector device as defined in claim 2 further comprising an auxiliary flap having a rounded lip, disposed along said nozzle means and movable about a spanwise axis, and means for causing such auxiliary flap to rotate about said axis to cause variations in the direction of the inducer jet issuing from said nozzle and naturally adhering to said auxiliary movable flap.

4. A device as defined in claim 2, wherein the inside surfaces of the flaps are convex in longitudinal section with a curvature that diminishes in passing from the leading edges to the trailing edges of the flaps, whereby said flaps are constructed to define, in said active position, a convergent-divergent diffuser.

5. An ejector device as defined in claim 2, further comprising movably mounted walls with plane surfaces parallel to the longitudinal axis of the aircraft, said walls being mounted endwise of the flaps whereby to prevent the penetration of atmospheric air laterally between said flaps.

6. In an aircraft having a wing, a retractible ejector device comprising, in combination, a channel traversing the thickness of the wing, said channel being disposed spanwise of the wing and defining the convergent portion of a downwardly-directed diffuser, two cooperating flaps mounted spanwise along the wing and each having a leading edge and a trailing edge, an inside surface and an outside surface, means for supporting said flaps in a retracted position while permitting said flaps to be moved into an active position, said flaps in said retracted position having at least part of their inside surfaces substantially applied against each other and having at least their outside surfaces extending the lower surface of a fixed part of said wing and close to said channel, and means for moving said flaps into said active position in which the inside surfaces of said flaps define the divergent portion of said downwardly-directed diffuser and their leading edges are spaced from said fixed part of said wing to provide a passage for the induction of ambient air, and two nozzles disposed spanwise at the lower end of said channel for injecting between said flaps in their active position two divergent sheets of fluid under pressure to diverge and induce said ambient air downward.

7. In an aircraft having a wing, a retractible ejector device comprising, in combination, a channel traversing the thickness of the wing, said channel being disposed spanwise of the wing and defining the convergent portion of a downwardly-directed diffuser, two cooperating flaps mounted spanwise along the wing and each having a leading edge and a trailing edge, an inside surface and an outside surface, means for supporting said flaps in a retracted position while permitting said flaps to be moved into an active position, said flaps in said retracted position having at least part of their inside surfaces substantially applied against each other and having at least their outside surfaces extending the lower surface of a fixed part of said wing and close to said channel, and means for moving said flaps into said active position in which the inside surfaces of said flaps define the divergent portion of said downwardly-directed diffuser and their leading edges are spaced from said fixed part of said wing to provide a passage for the induction of ambient air, and two nozzles disposed spanwise at the lower end of said channel for injecting between said flaps in their active position two divergent sheets of fluid under pressure to diverge and induce said ambient air downward, flaps pivoted respectively about axes situated at the upper surface of said fixed part of the wing and parallel to the longitudinal axis of said wing, means for moving said flaps from a retracted position in which they close the upper end of said channel into an active position wherein they are substantially perpendicular to said upper surface of the wing, and a high-lift flap disposed behind said wing for producing an aerodynamical moment balancing the one produced by said diffuser.

References Cited in the file of this patent

UNITED STATES PATENTS

| | | |
|---|---|---|
| 2,420,232 | Meyer | May 13, 1947 |
| 2,589,732 | Riviere | Mar. 18, 1952 |
| 2,885,162 | Griswold | May 5, 1959 |
| 2,940,690 | Wood | June 14, 1960 |
| 2,945,641 | Pribam | July 19, 1960 |
| 2,961,192 | Davidson | Nov. 22, 1960 |